Dec. 20, 1938.    R. A. GOEPFRICH    2,140,742
BRAKE
Filed Jan. 30, 1937    2 Sheets-Sheet 1
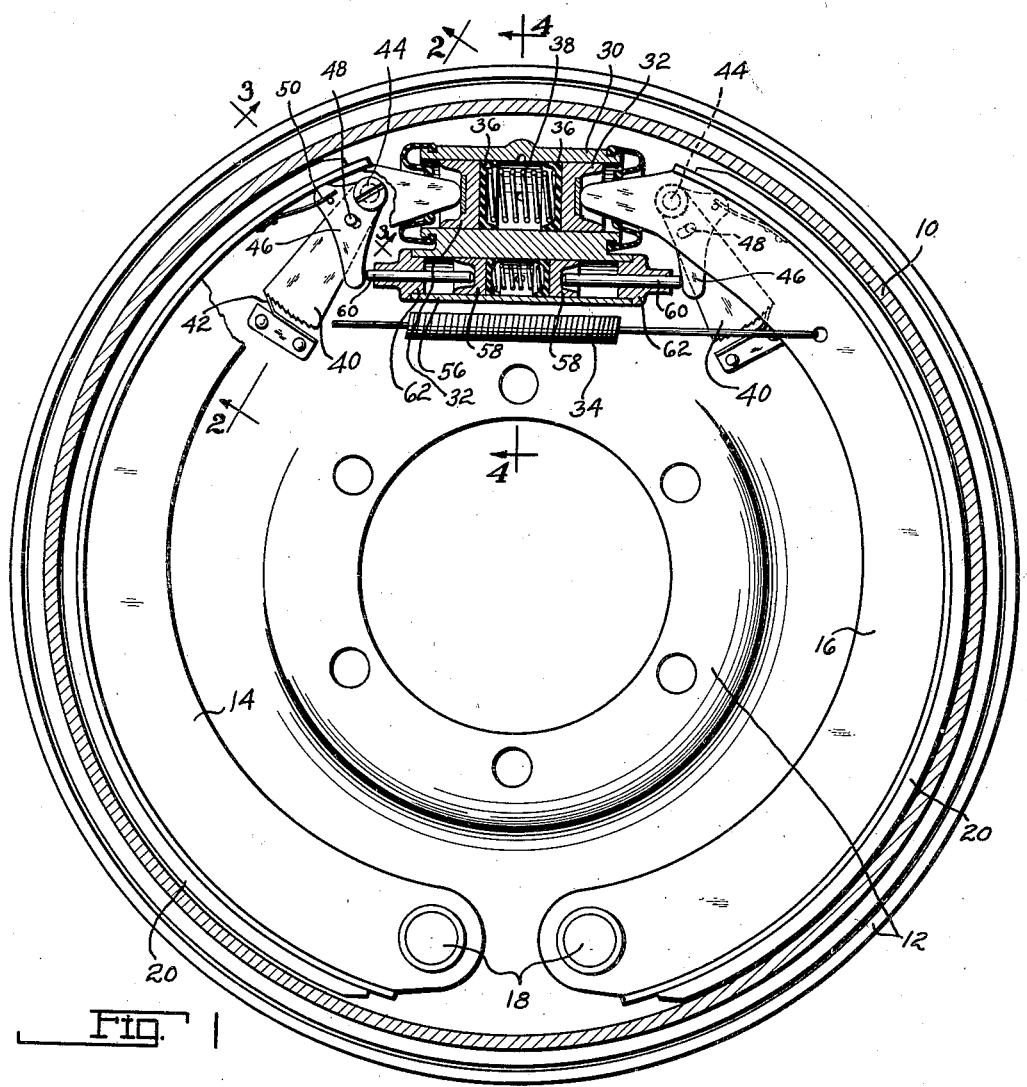
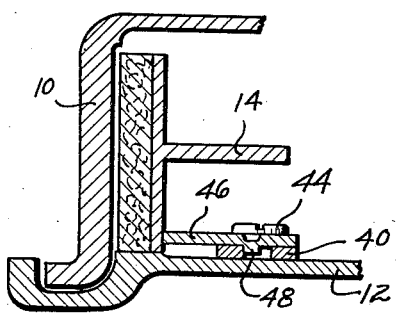
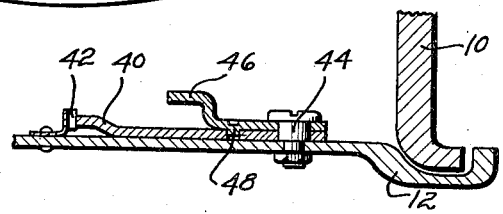
INVENTOR.
RUDOLPH A. GOEPFRICH
BY
M. W. McConkey
ATTORNEY.

Dec. 20, 1938.  R. A. GOEPFRICH  2,140,742
BRAKE
Filed Jan. 30, 1937  2 Sheets-Sheet 2
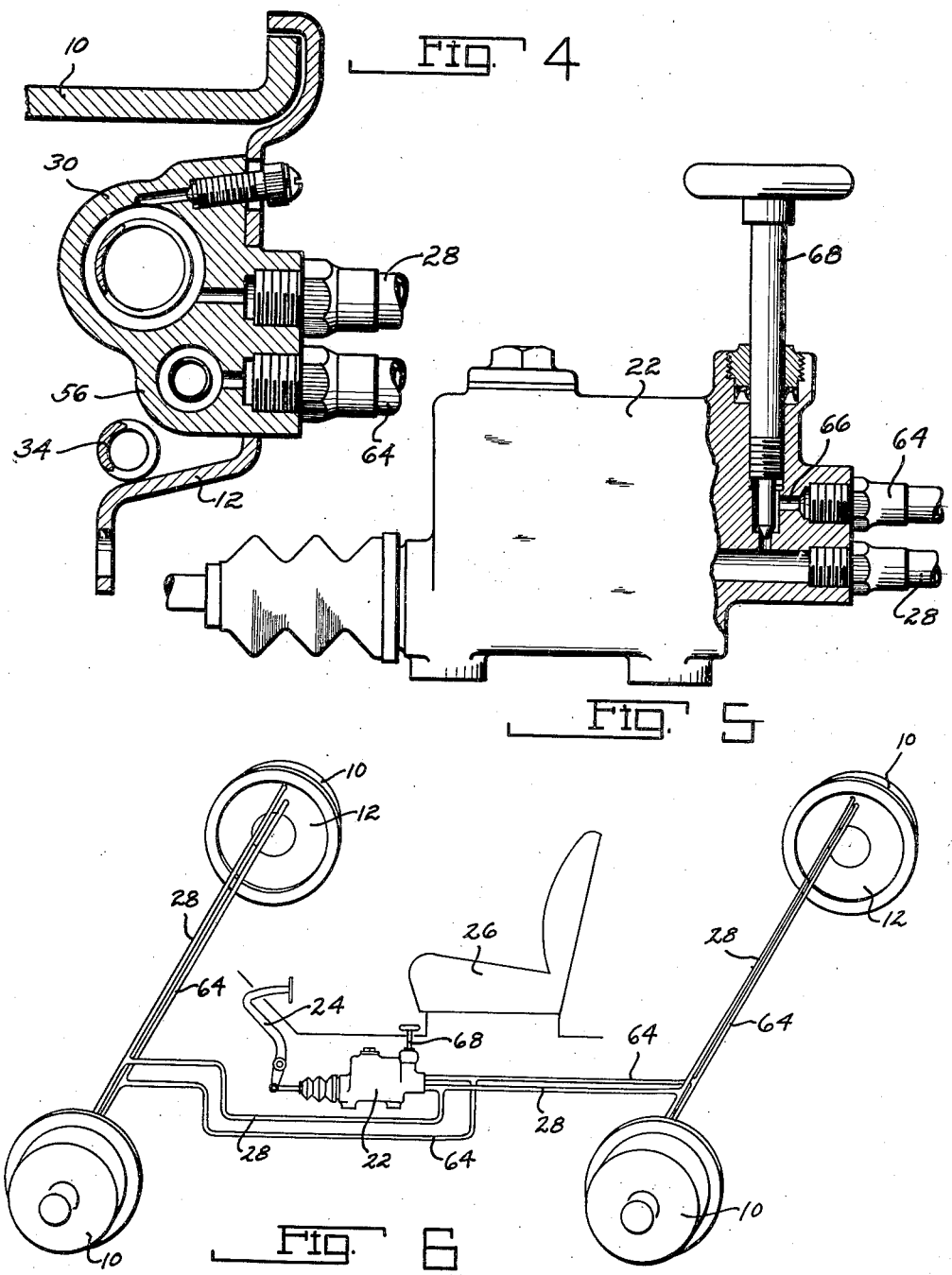
INVENTOR.
RUDOLPH A. GOEPFRICH
BY
ATTORNEY.

Patented Dec. 20, 1938

2,140,742

UNITED STATES PATENT OFFICE 2,140,742

BRAKE

Rudolph A. Goepfrich, South Bend, Ind., assignor to Bendix Products Corporation, South Bend, Ind., a corporation of Indiana Application January 30, 1937, Serial No. 123,188

9 Claims. (Cl. 188—79.5)

This invention relates to brakes, and is illustrated as embodied in a system of hydraulically-actuated internal expanding automobile brakes.

An object of the invention is to facilitate the adjustment of the brakes, preferably by adjusting them by means operable from the driver's seat and which is normally inoperative. Various features relate to the connections for making such adjustments, by utilizing the master cylinder or its equivalent, and to the structure and arrangement of the adjusting parts at the brake, and to the improvement of the master cylinder which permits it to be used in this manner.

These and other objects and features will be apparent from the following description of the illustrative embodiment shown in the accompanying drawings, in which:

Figure 1 is a vertical section through one of the brakes, just inside the head of the brake drum, and showing the brake shoes in side elevation;

Figures 2, 3 and 4 are partial sections through the brake, on the lines 2—2, 3—3, and 4—4 of Figure 1 respectively;

Figure 5 is a side elevation partly broken away, of the master cylinder; and

Figure 6 is a diagrammatic perspective of an automobile equipped with my invention.

The brake illustrated in Figures 1-4 includes a rotatable drum 10, at the open side of which is a support such as a backing plate 12, and within which are shoes 14 and 16 anchored on pivots or posts 18 carried by the backing plate. These shoes are faced with lining or friction material 20, and the present invention has to do with adjusting the brakes for the wear of this material.

The brake illustrated is intended to be applied by a hydraulic system including a master cylinder 22 (Figures 5 and 6), having a piston operable in the usual manner by a pedal 24 adjacent the driver's seat 26, and connected by conduits 28 to wheel cylinders 30. Each of the wheel cylinders 30 is mounted inside its brake, on the backing plate 12, between the unanchored ends of the shoes, and is provided with a pair of pistons 32 acting on the shoes, to apply them against the resistance of a return spring 34.

As a standard practice in commercial hydraulic brakes, the master cylinder 22 maintains a light pressure (not sufficient to overcome the springs 34) in the lines 28 and cylinders 30, even when the brakes are released, to make sure that no air will be sucked into the system and to hold the pistons 32 against the shoes. The pistons 32 may have sealing cups 36 held in position by means such as a spring 38.

Adjacent the unanchored end of each shoe 14 or 16 there is pivoted or otherwise movably mounted a shiftable member 40, held against retrograde movement by means such as a spring pawl 42. This member is shown connected to the backing plate by a pivot 44, on which is also mounted a lever or stop 46 having a portion engaged by the shoe when the brake is released, and which determines the clearance of the shoe in released position.

The lever stop 46 is connected to the shiftable member 40 by means, shown as a pin-and-slot connection 48, having a lost motion corresponding to the normal clearance of the shoe. A spring 50 urges the lever stop 46 to the end of its lost motion away from the brake drum, so that normally it remains in that position and serves as a stop to predetermine the released position of the shoe.

It will be noted that if, when the shoes are in their applied positions, the lever stops 46 are swung toward the drum, after taking up the lost motion at 48, if wear has taken place the members 40 will be shifted toward the drum to compensate for the wear.

To operate these lever stops 46 to make the adjustment in this manner, I prefer to provide hydraulic means operable from the driver's seat. The illustrated means includes a small auxiliary wheel cylinder 56 at each brake, parallel to and preferably forming an integral part of the same wheel cylinder assembly as the cylinder 30 but entirely disconnected therefrom so far as fluid connections go, i. e. having a separate inlet.

This auxiliary wheel cylinder is shown provided with pistons 58 (which may have sealing cups held by a spring the same as pistons 32), provided with connecting rods or the like 60 (shown guided by end plugs 62) engaging the lever stops 46.

The auxiliary wheel cylinders 56 are supplied with pressure fluid through a separate system of conduits 64 leading from a second outlet 66 of the master cylinder 22. This outlet is controlled by a needle valve 68, or the like, preferably operable from the driver's seat, and which is normally closed to render connections 64 inoperative.

When the valve 68 is opened by the driver, depression of pedal 24 not only applies the brakes but also rocks the lever stops 46 to make the adjustment desired.

While one illustrative embodiment has been described in detail, it is not my intention to limit the scope of the invention to that particular embodiment, or otherwise than by the terms of the appended claims.

I claim:

1. A vehicle having a driver's seat, wheel brakes, means operable from the driver's seat for applying the brakes, means for adjusting each of the brakes for wear, and hydraulic means having connections extending from a point adjacent to the driver's seat independently of the applying means and operable to actuate the several adjusting means simultaneously when the brakes are applied by the applying means.

2. A vehicle having a driver's seat, wheel brakes each comprising a hydraulically-operated wear adjusting device, hydraulic means operable from the driver's seat for applying the brakes, and means having connections extending from a point adjacent to the driver's seat and operable from the driver's seat concurrently with the applying means and operable to actuate the several adjusting devices when the brakes are applied by the applying means.

3. A vehicle having wheel brakes each having a hydraulic applying device and a hydraulic adjusting device, a master cylinder device having connections to the applying devices and separate connections to the adjusting devices, and means for rendering the connections to the adjusting devices inoperative at will.

4. A vehicle having wheel brakes each having a hydraulic applying device and a hydraulic adjusting device, and a master cylinder device having connections to the applying devices and separate connections to the adjusting devices.

5. A vehicle having wheel brakes each having a hydraulic applying device and a hydraulic adjusting device, a master cylinder device having connections to the applying devices and separate connections to the adjusting devices, and means for rendering the connections to the adjusting devices inoperative at will, each of said adjusting devices including a movable stop and a member for setting the stop connected by means having a lost-motion corresponding to normal brake clearance.

6. A vehicle having wheel brakes each having a hydraulic applying device and a hydraulic adjusting device, and a master cylinder device having connections to the applying devices and separate connections to the adjusting devices, each of said adjusting devices including a movable stop and a member for setting the stop connected by means having a lost-motion corresponding to normal brake clearance.

7. A brake comprising a shoe, a shiftable member adjacent the shoe, a stop having a connection with said member with a lost-motion corresponding to normal shoe clearance and which is movable against the shoe in its applied position and arranged after taking up the lost-motion to shift said member, means operable from the exterior of the brake for moving the stop against the shoe in applied position, and a spring urging the stop to the other end of the lost-motion to position the shoe when released.

8. A wheel cylinder assembly for a brake comprising two parallel unconnected cylinders having separate fluid inlets, and a pair of oppositely-acting separate pistons in each cylinder, in combination with a master cylinder having separate connections to said cylinders and a shut-off means for one of said connections.

9. A master cylinder having two outlets, and a manually-operable valve for opening and closing one of the outlets without affecting the other, in combination with a brake having an operative applying cylinder connected to the unrestricted outlet and having adjusting means operatively connected to the valved outlet.

RUDOLPH A. GOEPFRICH.